Oct. 24, 1950
G. McG. PIERCE
2,526,829
CONTROL APPARATUS FOR TRAVELING LETTER SIGNS
Filed June 9, 1947
6 Sheets-Sheet 2
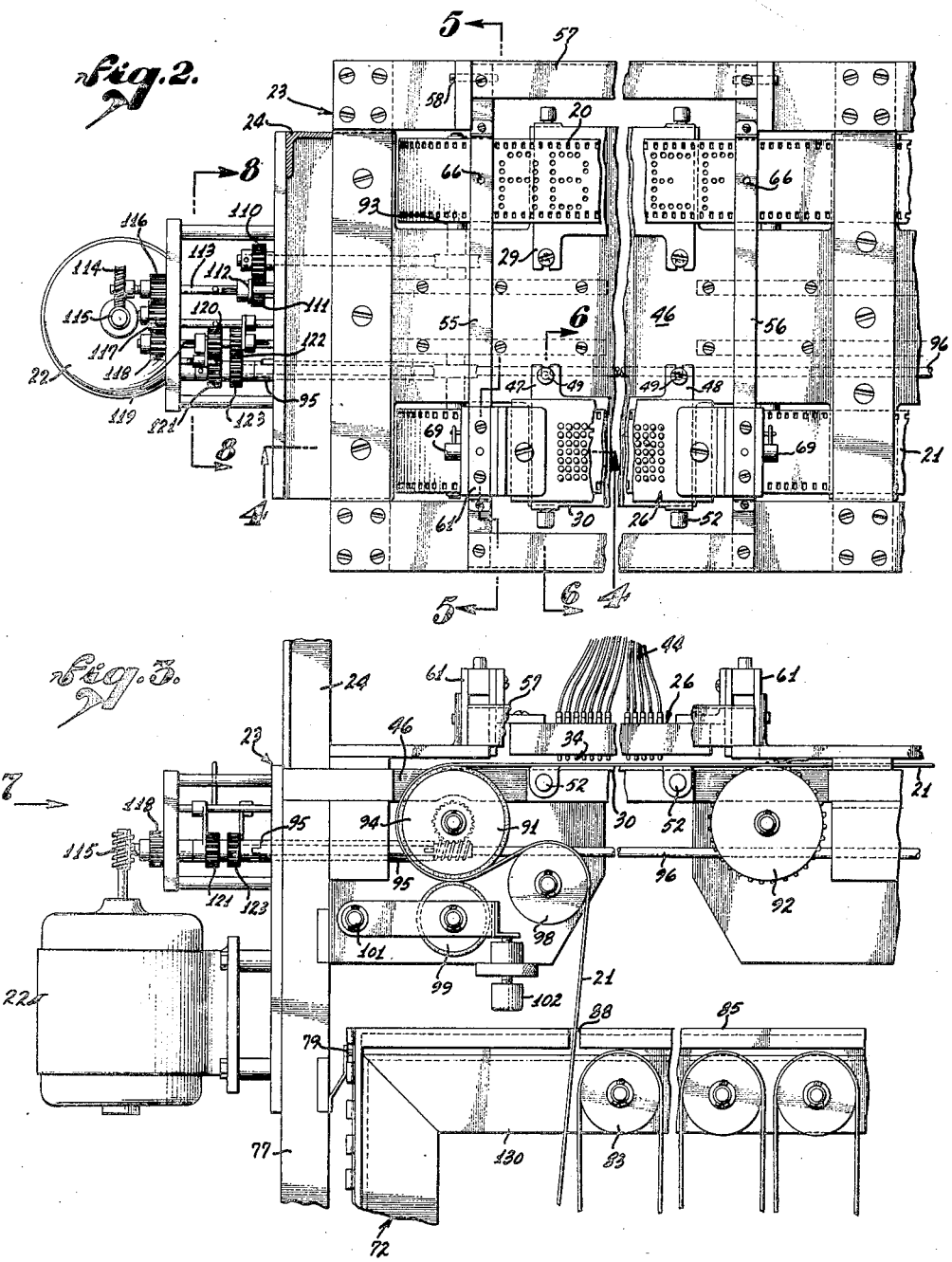
INVENTOR:
GEORGE McGUIRE PIERCE
BY
ATTORNEY.

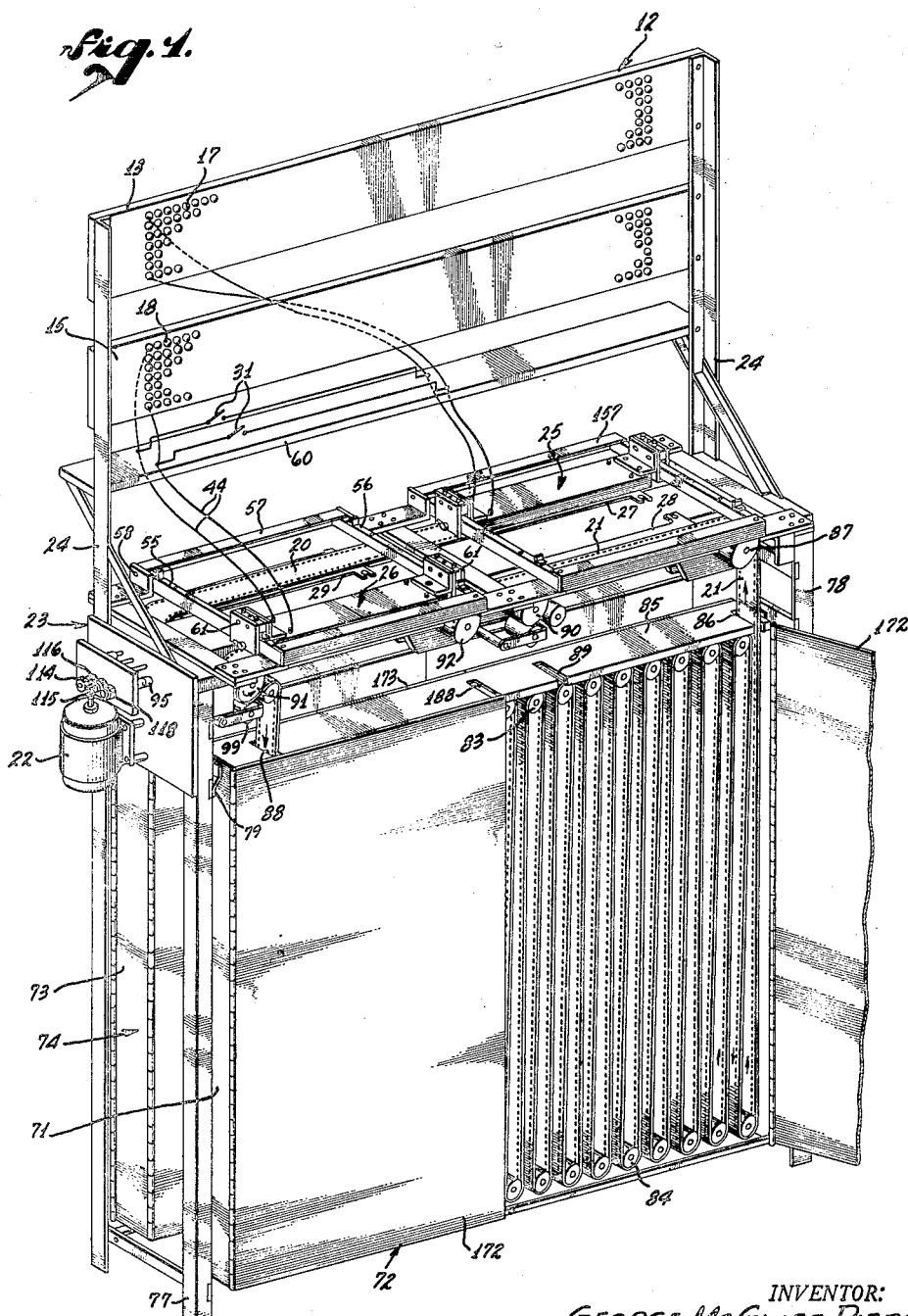

Oct. 24, 1950  G. McG. PIERCE  2,526,829
CONTROL APPARATUS FOR TRAVELING LETTER SIGNS
Filed June 9, 1947  6 Sheets-Sheet 3
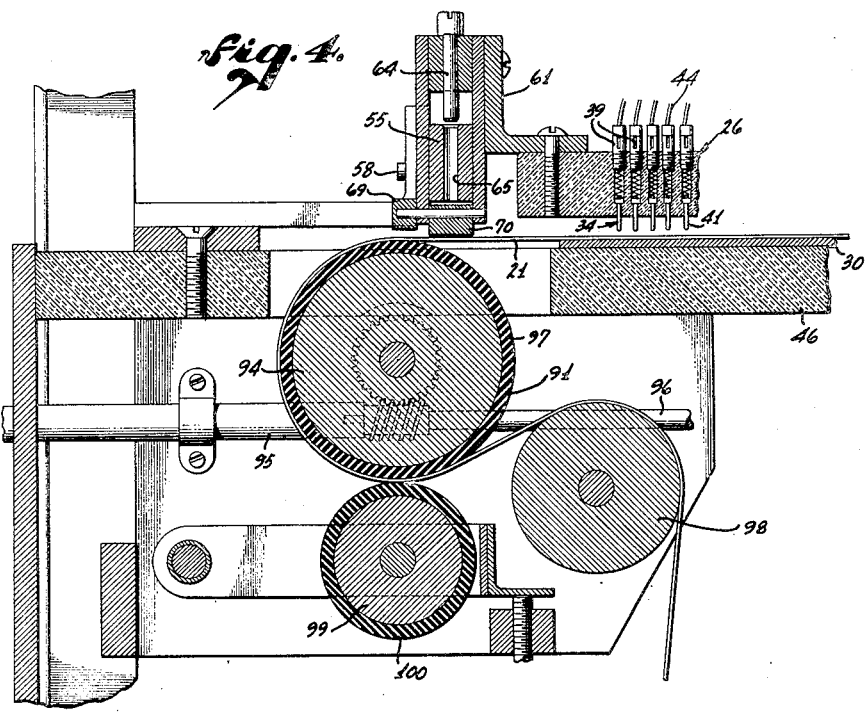
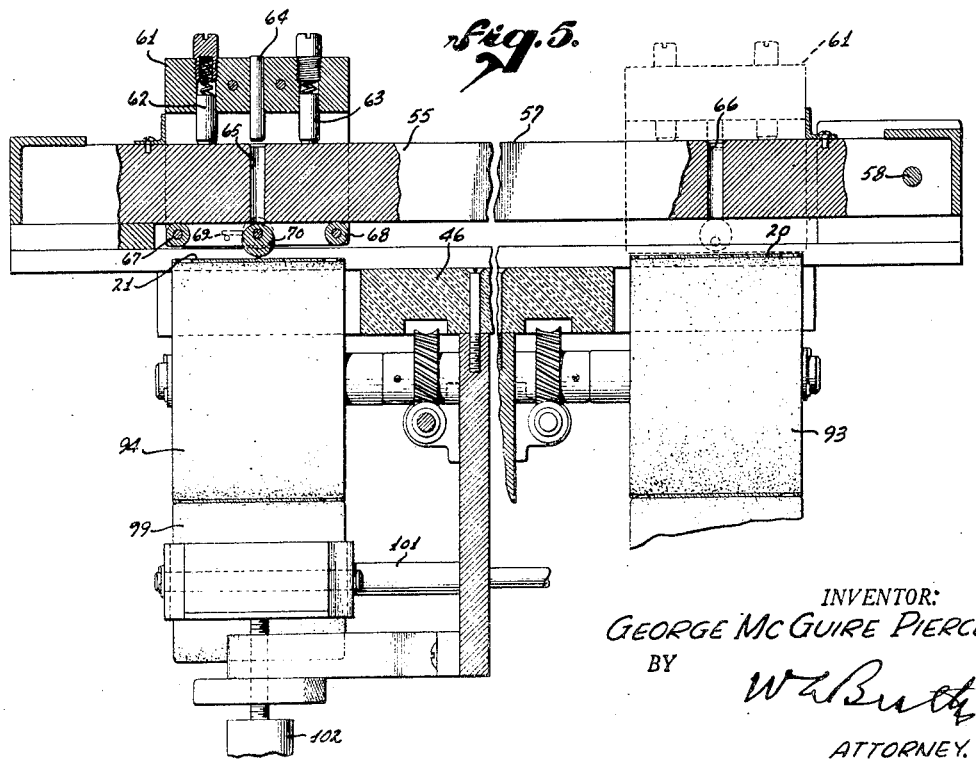
INVENTOR:
GEORGE McGUIRE PIERCE
BY
ATTORNEY.

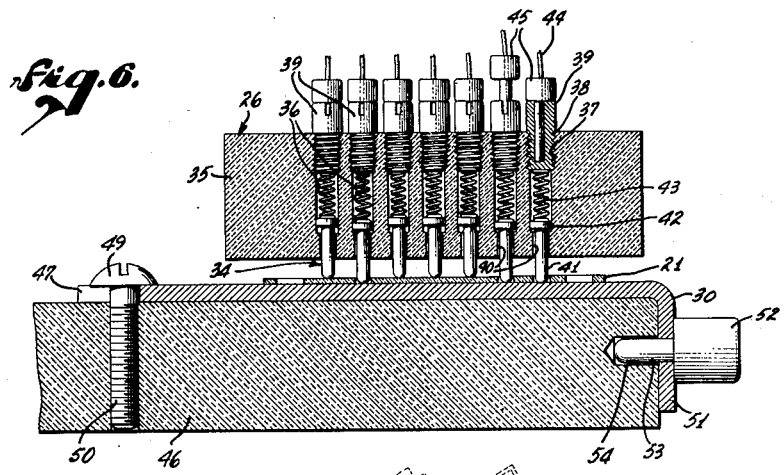
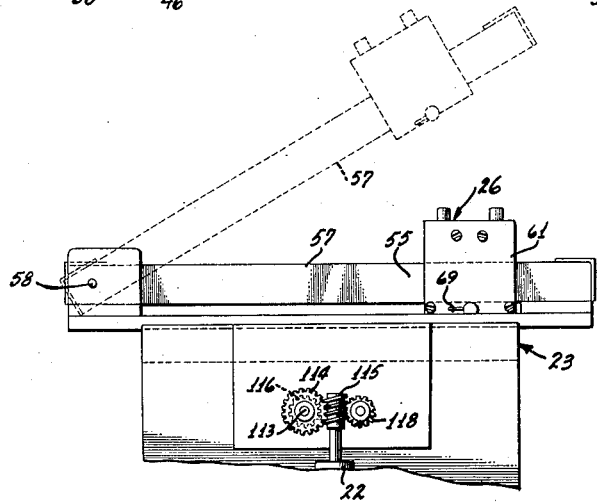
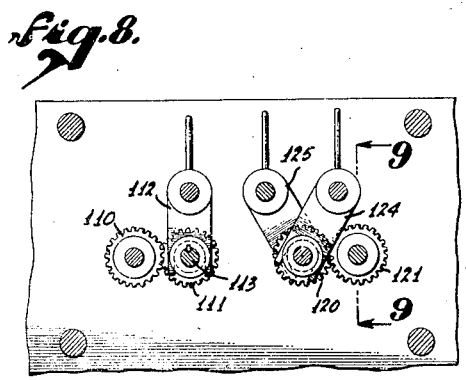
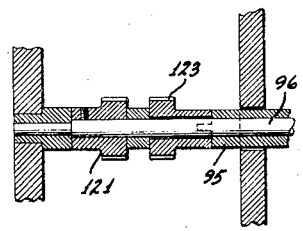
INVENTOR:
GEORGE McGUIRE PIERCE
ATTORNEY.

Oct. 24, 1950 G. McG. PIERCE 2,526,829
CONTROL APPARATUS FOR TRAVELING LETTER SIGNS
Filed June 9, 1947 6 Sheets-Sheet 5
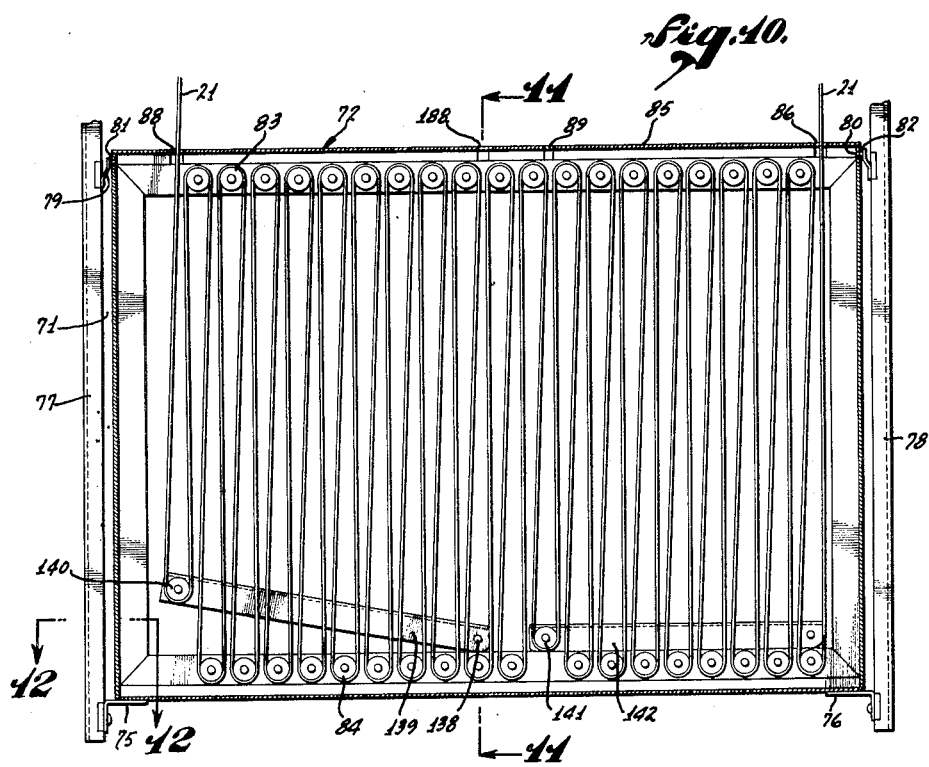
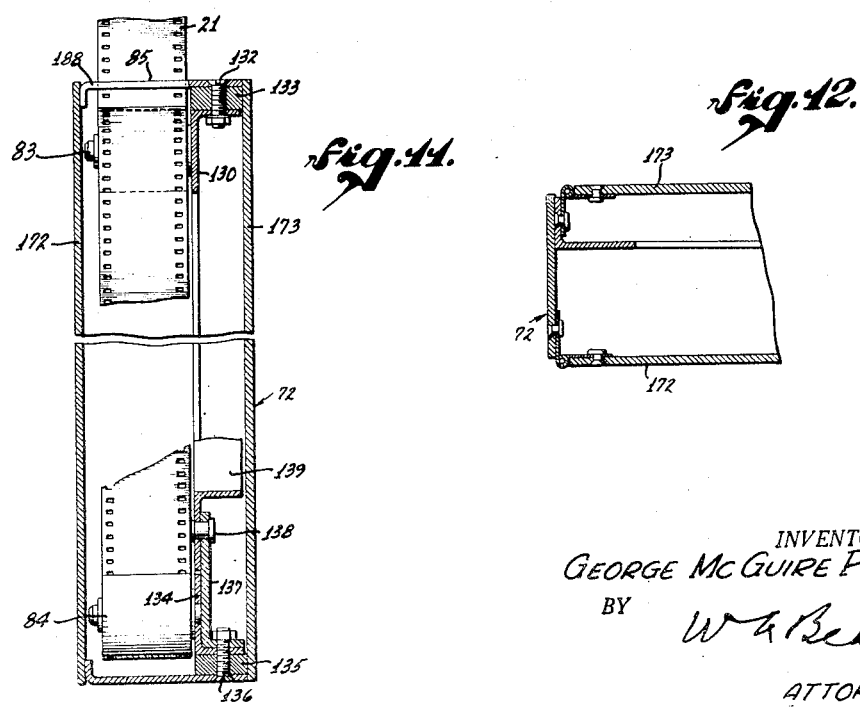
INVENTOR:
GEORGE McGUIRE PIERCE
BY
ATTORNEY.

Oct. 24, 1950 G. McG. PIERCE 2,526,829
CONTROL APPARATUS FOR TRAVELING LETTER SIGNS
Filed June 9, 1947 6 Sheets-Sheet 6

INVENTOR:
GEORGE McGUIRE PIERCE
BY
ATTORNEY.

Patented Oct. 24, 1950

2,526,829

UNITED STATES PATENT OFFICE 2,526,829

CONTROL APPARATUS FOR TRAVELING LETTER SIGNS

George McGuire Pierce, Los Angeles, Calif.

Application June 9, 1947, Serial No. 753,504

2 Claims. (Cl. 200—46)

The invention relates to improvements in control apparatus for traveling letter sign and more particularly for signs having a co-ordinate array of electric lamps forming a traveling message under control of a perforated tape.

One of the objects of the present invention is to increase the brilliance of the lamps which form the message. Such lamps do not attain normal brilliance for the reason that relation of the short interval of lamp energization, to the thermal lag of the filament of the lamp is such that the lamp is not energized for a period sufficiently long to attain normal brillance. It is not satisfactory to reduce the thermal lag because this would require the design of a special lamp and make it impossible to use commercial lamps now on the market. Also, it is not satisfactory to increase the length of the perforation in the tape because this slows up the message. According to the invention, from ten to twenty perforations per second can be employed in the tape with brilliant illumination of the lamps, by employing the usual household electric lamp intended for 120-volt supply circuit and by energizing such lamps with a super-normal voltage viz., 145 to 150 volts. If a lamp were constantly supplied with that high voltage, it would soon burn out, but tests have shown that the life of the lamp is not materially affected in this case as the application of such voltage is only for a brief instant, under control of the perforated tape.

Another feature of the invention relates to change over apparatus so that at the end of a message on one tape, a second message on a second tape can be switched in instantly. This is accomplished by providing a pair of perforated tapes each having a contact plate, with one shoe having a co-ordinate array of yielding contacts, with means for guiding the shoe out of operative relation with one of the tapes and into operative relation with the other tape. To insure continuous operation, two shoes may be provided so that one may be used as a spare for the other. The spare shoe may pick up the same message from one tape, or it may pick up the same or another message if two tapes are used.

Another feature of the invention relates to facilitating replacement or repair of the contacts in case of wear. This is accomplished by making the yielding contacts of comparatively hard metal and the contact plate of softer metal, with means for readily removing the contact plate for replacement by a new plate. The invention also provides an improved form of yielding or spring pressed contact whereby the lamp circuit for a particular contact may be readily removed or changed and whereby either the spring for a sliding contact or the contact itself may be readily adjusted, removed or replaced. Also the yielding contacts terminate in jacks and each lamp circuit terminates in a plug whereby the lamp circuits can be readily disconnected from the shoe, for repairing the shoe.

Another feature of the invention relates to the drive for propelling or traversing the tape along the tape path between the contact plate and the yielding contacts. According to the invention this drive comprises an idle film sprocket, the tape preferably being 35 mm. motion picture film, at the lagging side of the film path, with a friction drive spool at the leading side of the film path. Tests have shown that this type of drive will maintain the film accurately in its path, where, for example, seven rows of contacts lengthwise of the film are employed for the formation of the message perforated in corresponding seven rows of apertures lengthwise of the film. Preferably means are provided for adjusting the frictional engagement of the film with its friction drive roller. The friction drive is preferably provided at separated places lengthwise of the same film path whereby a short length of film may be threaded across a given sprocket and its associated friction drive, or a longer length of film may be threaded from that film sprocket to the friction drive of the next unit, the support for the contact shoes making it possible to shift either contact shoe in line with the same film path to establish contact for either the short film or the long film.

The invention also provides an improved magazine for the film whereby the film is stored in a plurality of loops and these loops may fill the entire magazine for a message of maximum length or these loops may fill only a part of the magazine for a shorter message, a free loop, which is short for the short message and long for the long message, being provided at the outside of the magazine in position for threading through the contact apparatus when the magazine is in place in its casing. A removable support for the magazine and doors at opposite sides of the magazine make it possible to mount the magazine in operative relation to either one of two film paths at opposite sides of the casing. The doors at the opposite sides of the magazine may, of course, be kept closed to protect the stored film when the magazine is not in use and such doors, in fact, can remain closed while the magazine is in use, the magazine having suitable apertures to lead the film from the magazine through either a short length, or the full length of the film path through the electrical contacts.

Another feature of the invention relates to a monitor, and makes it possible for the operator at the tape apparatus to see whether the apparatus is functioning properly by examining a local monitor panel having a co-ordinate array of lamps corresponding to the array on one or more signs at a remote point, making it unnecessary for the operator to set the apparatus in motion and go to the remote point to check the operation. The operator can also watch the monitor panel and thereby watch the traveling message being spelled out on the remote sign to thereby check the operation of the apparatus. By way of example, the remote point may be the top of a bus or other vehicle where the sign or signs are located, while the control apparatus and the monitor panel may be arranged inside of the vehicle or the like.

Preferably a plurality of signs are employed, and the control apparatus makes it possible either to produce the same traveling message on all signs or one message may appear on certain of the signs, and another message on the other signs.

The shadow box device for shading the signs from the sunlight or daylight is disclosed and claimed in the following cases, Design Letters Patent No. 152,433, dated January 18, 1949, for Traveling Letter Advertising Sign for Vehicles; S. N. 751,822, filed June 2, 1947, for Shadow Box Device for Traveling Letter Sign.

For further details of the invention, reference may be made to the drawings wherein Fig. 1 is a perspective view of control apparatus according to the present invention.

Fig. 2 is an enlarged horizontal sectional view above and showing the switching means of Fig. 1 in plan view, with parts broken away.

Fig. 3 is an enlarged view in side elevation of the parts shown in Fig. 2.

Figs. 4, 5 and 6 are enlarged sectional views on lines of the corresponding numbers in Fig. 2, looking in the direction of the arrows.

Fig. 7 is an end view in elevation, looking in the direction of the arrow 7 in Fig. 3, showing the head in raised position in dotted line.

Fig. 8 is an enlarged sectional view on line 8—8 of Fig. 2, looking in the direction of the arrows.

Fig. 9 is an enlarged sectional view on line 9—9 of Fig. 8, looking in the direction of the arrows.

Fig. 10 is a vertical sectional view through the front of one of the magazines and showing the magazine support.

Figs. 11 and 12 are enlarged sectional views on lines of the corresponding numbers in Fig. 10.

Figure 13:
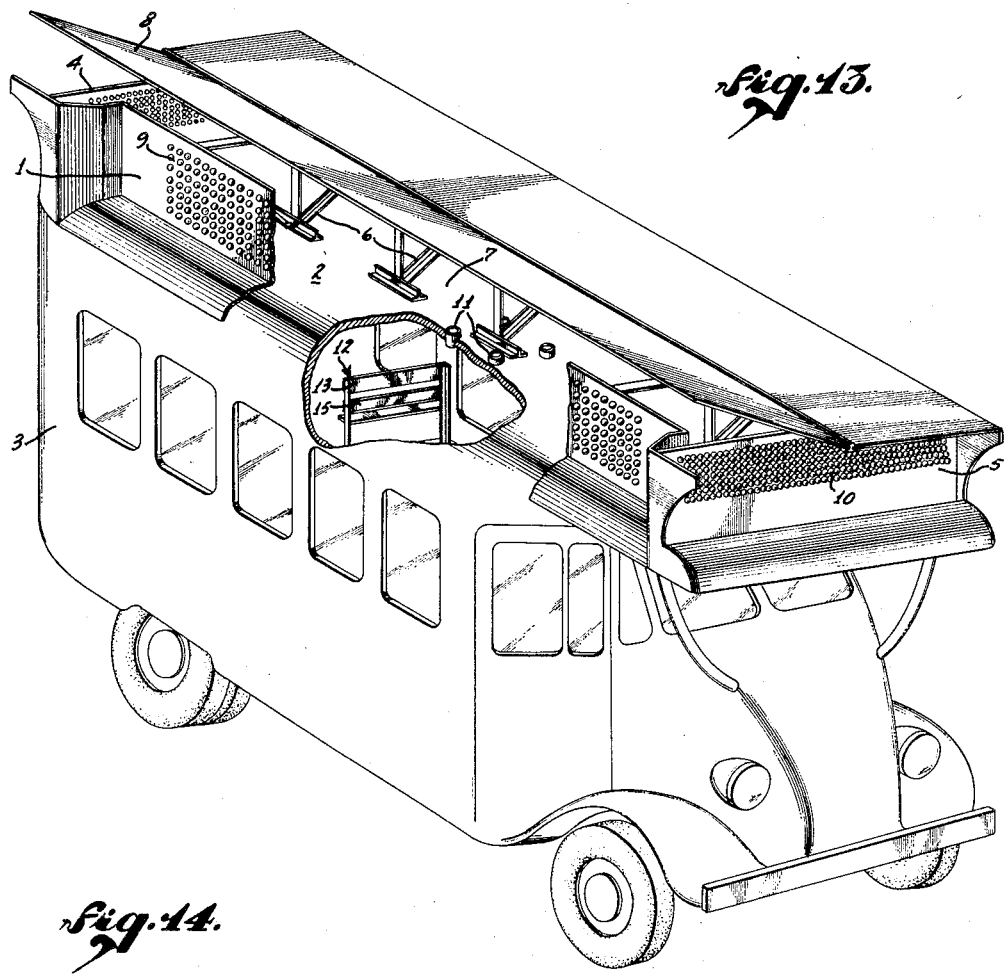
Fig. 13 is a perspective view of a vehicle having signs operated by control apparatus of this invention, parts being broken away.

Referring in detail to the drawings, Fig. 13 shows a sign 1 which extends substantially the full length of the roof 2 of a truck 3, the central portion of this sign being broken away in order to show other features. A similar and parallel sign not appearing in this figure, is arranged at the other side of the roof 2, and across the ends of these side signs like 1, are two end signs 4 and 5. These signs 1, 4, and 5 are supported in position by suitable supports 6. These signs form an enclosure 7 covered by a hinged cover 8. Each of these four signs, 1, 4, and 5 has a co-ordinate array of electric lamps, the array for sign 1 being indicated at 9 and the array for sign 5 being indicated at 10. The wiring for the lamps in the arrays like 9 and 10 for all four of the signs are led through one or more outlets like 11 in the roof 2, this wiring leading to the control apparatus indicated at 12 in the body of the truck.

Figure 14:
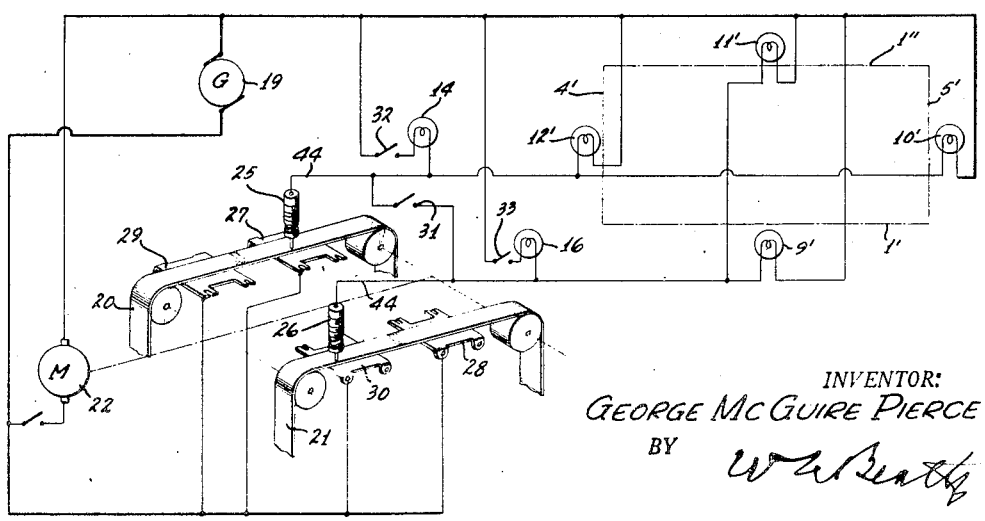
Fig. 14 is a schematic wiring diagram of the lamp circuits controlled by the control apparatus of the other figures.

The control apparatus 12 is illustrated in Fig. 1 and the wiring diagram for the lamps like 9 and 10 is illustrated in Fig. 14 wherein the sign corresponding to 1 is indicated by the broken line 1', the parallel sign of the other side is indicated by the broken line 1'', one end sign corresponding to 4 is indicated by the broken line 4' and the sign corresponding to 5 is indicated by the broken line 5'. One of the lamps of the array 9 is indicated in Fig. 14 at 9', the corresponding lamp in the array 10 is indicated at 10', the corresponding lamp for the sign indicated by 1'' is indicated at 11', the corresponding lamp for the sign indicated at 4' is shown at 12', a corresponding lamp on the monitor panel 13 in Fig. 1 is shown at 14 in Fig. 14 and a corresponding lamp on the monitor panel 15 in Fig. 1 is shown at 16 in Fig. 14. The monitor panels 13 and 15 have a co-ordinate array of miniature lamps indicated at 17 and 18 respectively, corresponding to the co-ordinate arrays on the signs like 1, 4, and 5.

While the signs like 1, 4, and 5 are here illustrated as being arranged on top of the truck 3, they or any one may be supported in any other suitable manner, either by some other kind of a vehicle or by a stationary support such as a building. The lamps for the signs 1, 4, and 5 and for the monitor panels 13 and 15, are energized by a suitable source of voltage, indicated in Fig. 14 as D. C. generator 19 which may be a power plant inside the truck 3, or it may be the usual 110-volt A. C. power line if the signs are arranged on a stationary support. The various lamps on the signs 1, 4, and 5 and on the monitor panels 13 and 15 are illuminated with current from source 19 under control of two perforated tapes 20, 21 which are preferably motion picture 35 mm. film. The film should be acetate or other non-inflammable material. The tapes 20 and 21 are propelled by a motor 22 suitably supported on the side of a casing 23 having suitable posts like 24 to support the monitor panels 13 and 15. The motor 22 is energized by current from the source 19.

The circuit for all of the lamps is controlled by two shoes schematically indicated at 25 and 26 in Fig. 14, both similar in construction and each carrying a co-ordinate array of yielding contacts as indicated in Fig. 6, and later described. As shown in Fig. 14, and later described, each of the shoes 25 and 26 can be positioned over either one of the tapes 20 and 21 and for this purpose, shoe 25 has a cooperating contact plate 27 for tape 20 and a cooperating contact plate 28 for tape 21, while shoe 26 has a contact plate 29 for tape 20 and a contact plate 30 for tape 21. In Fig. 14, shoe 25 is in an elevated and idle position, while the shoe 26 is lowered and operative to complete the circuit for lamps through the perforations in tape 21, the circuit being completed through the plate 30, and in this case the lamps for all four of the signs are controlled by the tape 21 whereby the same message appears on all four of the signs indicated at 1', 5', 1'', and 4'. In this case, a bridge connection controlled by switch 31 connects the shoes 25 and 26 whereby the end of a message on one tape such as 21 or the end of a given program period, may be instantly followed by the message on tape 20, by rendering shoe 26 idle and rendering shoe 25 active. Also, one of the shoes 25 or 26 can be used as a spare for the other, for either one or both films, 20, 21. If desired, the switch 31 may be left open and both of the shoes 25 and 26 made active at the same time, whereby the message on tape 21 will appear at the lamps 9' and 11' for the side signs, while the message on tape 20 will appear at the lamps like 10' and 12' for the end signs. The lamps like 14 serve as a monitor for the lamps like 10' and 12' for the end signs, while the monitor lamps like 16 pertain to the lamps 9' and 11' for the side signs. If the same message appears on all four of the signs, it is not necessary to use the monitor lamps on both of the panels 13 and 15, and one of these panels can be disconnected as indicated by switches like 32 or 33.

The lamps on the main signs like 1, 4, and 5 are arranged in a suitable number of horizontal rows here indicated as seven in number, each tape like 21 as indicated in Figs. 1 and 6 having the same number of rows lengthwise of the film, and each contact shoe like 26 as shown in Fig. 6 having seven lengthwise rows of yielding contacts generally indicated at 34 in Fig. 6. Each contact of the group 34 completes the circuit to a particular lamp when it passes through an aperture in one of the tapes like 21 to contact a plate like 30. The message perforated on each tape like 20 and 21 travels across the lamps on all signs, as the tape moves, as is well understood. Preferably, the tape is driven at a speed such that the lamp circuit is interrupted from 10 to 20, for example 14 times per second, and as above explained, this rate of interruption, in proportion to the thermal lag of the filament of a commercial lamp is such as the lamp is not illuminated with normal brilliance when the lamp is energized with its rated voltage such as 120 volts. As above explained, the lamps are illuminated with normal brilliance by having source 19 in Fig. 14 supply a super-normal voltage such as 145 to 150 volts when 120 volt lamps are used.

As shown in Fig. 6, the shoe 26 comprises a strip 35 of insulating material having a coordinate array of bores 36 extending therethrough. The upper end of each bore is of larger diameter and has screw threads 37 for the threads 38 on a jack or sleeve 39. The lower portion of the bore 36 is elongated and of reduced diameter as indicated at 40 to slidingly support a contact pin 41 which projects beyond the bottom of the insulating strip 35, to rest on the tape 21. Pin 41 has an enlarged head 42 which slides in the upper portion of bore 36. The pin 41 is urged downwardly by a spring 43 which electrically connects the jack 39 to the pin 41, the jack 39 serving as an abutment for the upper end of spring 43. One conductor, as indicated at 44 for each lamp terminates in a plug 45 which fits in any of the jacks 39, whereby all of the plugs like 45 can be removed from their jacks like 39 to disconnect the lamps from the shoes 26 whereby the shoe 26 may be removed for repair or replacement.

The contact pins in the group 34, and one of which is indicated at 41, are preferably of comparatively hard metal such as nickel chrome alloy, while the plates like 30 are preferably of comparatively soft material such as brass with or without silver plating thereon. Each plate like 30 is removably supported in position and for this purpose the casing 23 has a frame member 46 to support the plate 30 and plate 30 has a pair of U-shaped lugs 47 and 48 (see Fig. 2) each adapted to engage under the head 49 of a screw like 50. The front edge of the plate 30 is bent downwardly at right angles to engage the front edge of the frame member 46, as indicated at 51. Secured to the front edge 51 is a handle 52 having a stud 53 to engage in an aperture 54 in the front of the member 46. When it is desired to replate or resurface a plate like 30, its screws like 50 are loosened and the handle like 52 employed to remove the plate.

As shown more particularly in Figs. 1 and 4 to 7, the shoe 26 slides on rails 55, 56 which form the sides of a frame 57 pivoted as indicated at 58 at one side of the tape 20, to the top of the casing 23. The conductors like 44 from the shoe 26 are led to a connecting panel 60, and such conductors have sufficient length so that the shoe 26 may be positioned over either one of the tapes 20 and 21. Shoe 25 has a similar frame 157.

As shown in Figs. 1, 4, and 5, the shoe 26 at each end thereof has a supporting shoe like shoe 61 in Fig. 4 to embrace its rail like 55, the shoe 61 being urged to an elevated position by a pair of spring pressed plungers 62 and 63, as shown in Fig. 5. Also, each shoe has a downwardly extending pin like 64 to engage an aperture 65 at one end of the rail to center the contact shoe 26 over one of the tapes, and a similar aperture 66 at the other end of the rail to center the shoe 26 over the other tape. The shoe 61 carries spaced rollers 67, 68 which engage the under side of the rail 55. The contact pins 34 carried by the shoe 26 are brought down into operative relation with the contact plate 30 by operating a handle 69 to rotate a cam 70 engaging the bottom of rail 55 and carried at the bottom of the shoe 61. The other contact shoe 25 is similarly supported and constructed, whereby each of these shoes 25, 26 may be brought into operative relation with either one of the tapes 20 or 21.

As shown in Fig. 1, one side of the casing 23 has a compartment 71 for a film magazine 72 and the opposite side of casing 23 has a similar compartment 73 for a similar film magazine 74, the casing 23 having means for removably supporting the magazines 72 and 74 in position. As shown in Fig. 10, this means comprises a shelf like 75 and 76 on the legs 77 and 78 of the casing 23 to support the bottom of the magazine 72, the upper portion of legs 77 and 78 having a spring pressed detent 79, 80 to catch apertures 81, 82 at the upper end portions of the magazine. The magazine 72 has an upper row 83 and a lower row 84 of film spools to support the film 21 in a progressive series of vertical loops. The magazine 72 has a top 85 having an aperture 86 for egress of the film 21 and when magazine 72 is in position in casing 23, the outlet 86 is below and adjacent an idle sprocket 87 suitably supported on the casing 23. The portion of film 21 outside of and at the top of magazine 72 is in a loop, the film 21 being endless, and as shown in Fig. 1, this loop may extend from the outlet 86 the full width of magazine 72 to an inlet 88, in the event that the magazine 72 is stored full of film, whereas for a shorter length of film, the film 21 may be led into an inlet 89 at the top of magazine 72. For the shorter length of film, it is led from sprocket 87 through a friction drive 90 into inlet 89, whereas for a full supply of film as shown in Fig. 1, the film is led from sprocket 87 through a friction drive 91 into inlet 88. The drive 91 also has an associated idle sprocket 92 so that the drive 87 and 90 may be used for one short strip of film in magazine 72 and the drive 91, 92 may be used for another short strip of film which may leave the magazine at the aperture 188 and enter it at inlet 88.

The magazines 72 and 74 are interchangeable, each having doors like 172, 173 front and back, whereby if magazine 72 were loaded in compartment 73, the doors 172 which appear in Fig. 1 as front doors would then be rear doors, and doors 173 would be the outside or front doors, and the spring catches like 79, 80, see Fig. 10, are positioned accordingly.

As shown in Figs. 10 and 11, the upper spools 83 are rotatably carried by an angle iron 130 bolted to the top 85 of magazine 72 by bolts like 132 having a spacer 133. The lower spools 84 are similarly carried by an angle iron 134 having a spacer 135 and bolts like 136. The particular bolt 136 shown in Fig. 11 also holds a bracket 137 having a pivot 138 for an arm 139 having at its outer end a spool 140 below inlet 88, see Fig. 10, to apply tension to either a full length or half length film entering at 88 and take up the slack while allowing such film to shrink or elongate. This tension is due to the weight of arm 139, or a spring not shown can be added to urge the arm 139 downwardly. A similar take up spool 141 on arm 142 is provided below aperture 89 to take up the slack when a short film enters at 89. As shown in Fig. 10, both rollers 140, 141 can be used for a full length film, or roller 141 can remain idle.

It has been found that the idle sprocket 87 with the friction drive 90 or 91 guides the film in a straight line without any additional edge guide. At the other side of the casing 23, a full length path for the film is provided, a friction drive 93 in Fig. 2 being provided at the left end of the machine and an idle sprocket like 87 being provided in line with 87. The tape driving rolls are similar in all three of the friction drives 90, 91, 93. The drive 91 is shown in Fig. 4, wherein the tape 21 is led over a friction roll 94 driven by a hollow shaft 95 having an inner shaft 96 which is geared to the corresponding friction roll in the drive 90. The roll 94 has a covering 97 of rubber or other resilient friction material and the film 21 is wrapped around the roll 94 for more than one-half of its circumference by an idle roller 98. Below the roll 94 is arranged a pressure friction roll 99 having a rubber or other friction surface 100 to engage the film 21 and press it into engagement with the roll 94. Roll 99 is pivotally supported as indicated at 101 and a screw 102 is adjusted to vary the pressure exerted by roll 99.

The motor 22 drives the three friction rolls like 94 and each drive has a clutch. As shown in Fig. 2, the friction drive 93 is geared to a driven gear 110 and the driving gear 111 can be moved into and out of engagement with gear 110, by a fork 112, see Fig. 8. Gear 111 slides on a shaft 113 having a worm gear 114 driven by a worm 115 on the shaft of motor 22. Shaft 113 has a gear 116 which drives an idle gear 117, the latter driving a gear 118 on shaft 119, the latter having a gear 120 which can be coupled to or uncoupled from gear 121 on the inner shaft 96 and a gear 122 which can be coupled to or uncoupled from a gear 123 on the hollow shaft 95. Gear 120 has a fork 124 and gear 122 has a fork 125. Any other suitable clutch means may be provided for connecting or disconnecting the friction drives 90, 91 and 93.

It will be apparent that news, advertising or other messages may be perforated on the tapes 20, 21, these tapes preferably being motion picture film as it is readily available. Instead of employing sprockets like 87 and 92, use may be made of film which either does or does not have sprocket holes in combination with some other type of edge guide roller such as a smooth roller having a flange at each end thereof.

Instead of producing a traveling message on the sign or signs like 9, 10, the tape like 20, 21 may be held stationary, or a plate having a message punched in it may be held stationary, to produce a stationary message.

The shoe frames 57 and 157, as shown in Fig. 1, in being pivoted permit the shoes 25 or 26 to be quickly raised and lowered for inspection or repair.

As the stand 23 in Fig. 1 may be made of light weight material such as aluminum, it will be apparent that the invention provides control apparatus which is light in weight and also compact. The equipment is also readily serviced, easy to manufacture and maintain. Also, the equipment gives insurance against breakdown and makes it possible to establish a new message on the sign with considerable speed, due to the facility for substituting one magazine for another and due to the ease of threading the tape.

Various modifications other than those described above may be made in the invention without departing from the spirit of the following claims.

I claim:

1. Control apparatus for traveling letter sign, said apparatus comprising a pair of parallel contact plates arranged in parallel tape paths, a pair of parallel rails extending crosswise of said paths, a shoe having a co-ordinate array of yielding contacts, means slidingly supporting said shoe on said rails, spring means urging said shoe in an elevated position, means operative to lower said shoe, and cooperating means between said shoe and at separated points along said rails for centering said shoe over either of said plates.

2. Control apparatus for traveling letter sign, said apparatus comprising means providing a tape path, a contact plate for said path, a pair of parallel rails extending crosswise of said path, a shoe having a coordinate array of yielding contacts, means slidingly supporting said shoe on said rails, spring means urging said shoe in an elevated position, means operative to lower said shoe, and cooperating means between said shoe and said rails for centering said shoe over said contact plate.

GEORGE McGUIRE PIERCE.

REFERENCES CITED

The following references are of record in the file of this patent:

UNITED STATES PATENTS

| Number | Name | Date |
|---|---|---|
| 510,188 | Pennock | Dec. 5, 1893 |
| 1,050,203 | Bickley | Jan. 14, 1913 |
| 1,155,466 | Bickley | Oct. 5, 1915 |
| 1,326,864 | Herman | Dec. 30, 1919 |
| 1,616,363 | Gammeter | Feb. 1, 1927 |
| 1,627,993 | Pedersen | May 10, 1927 |
| 1,651,275 | Hirsh | Nov. 27, 1927 |
| 1,717,370 | Coleman | June 18, 1929 |
| 1,726,348 | Haase | Aug. 27, 1929 |
| 1,769,060 | Hendry | July 1, 1930 |
| 1,831,562 | Heisler | Nov. 10, 1931 |
| 2,063,006 | Rustad | Dec. 1, 1936 |